Oct. 18, 1938.　　　　B. JANSSEN　　　　2,133,748
LIGHT SHADE
Filed April 3, 1937
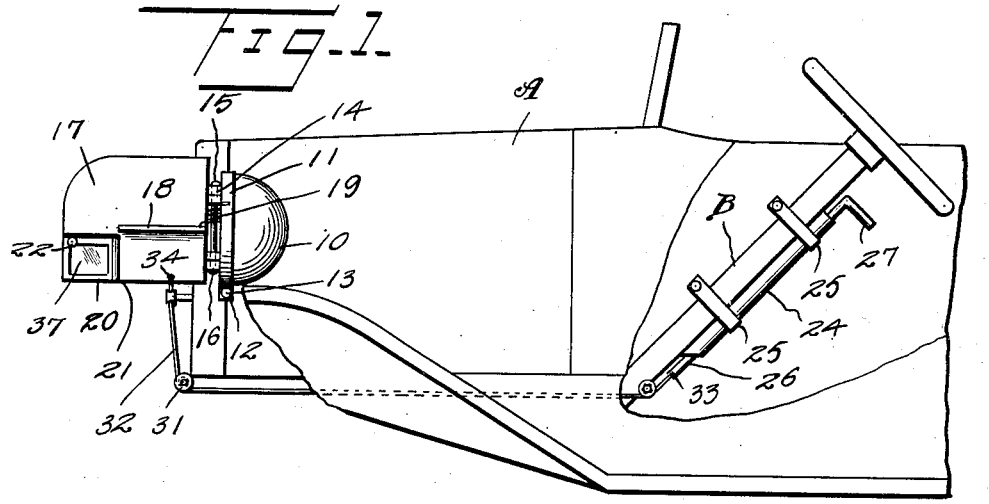
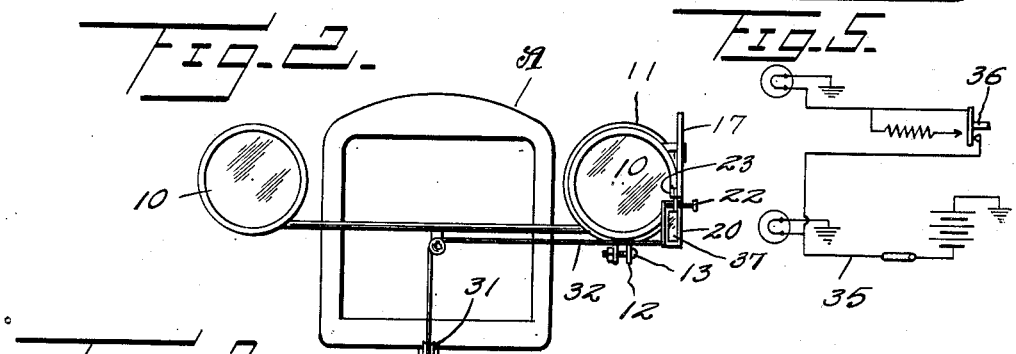
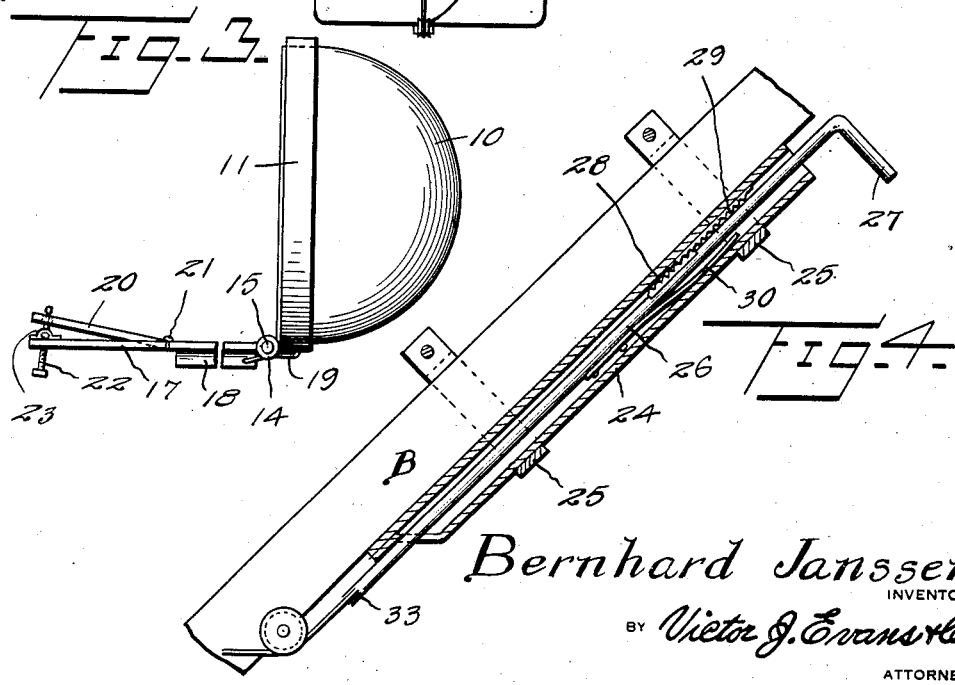
Bernhard Janssen
INVENTOR
BY *Victor J. Evans & Co.*
ATTORNEY Patented Oct. 18, 1938

2,133,748

UNITED STATES PATENT OFFICE 2,133,748

LIGHT SHADE

Bernhard Janssen, Philadelphia, Pa.

Application April 3, 1937, Serial No. 134,916

1 Claim. (Cl. 240—45.6)

The invention relates to a light shade and more especially to a light diverter for the headlamps of motor vehicles.

The primary object of the invention is the provision of a device of this character, wherein the same is mountable upon the headlamps of a motor vehicle in a position to divert the rays of light from such lamp at the left hand side of the vehicle to the right hand side thereof and in this manner avoiding blinding an approaching driver or pedestrian and in this way assuring safety during driving especially to drivers of approaching vehicles on a highway.

Another object of the invention is the provision of a device of this character, wherein the mounting thereof is novel and such device is susceptible of adjustment by the driver of the vehicle when within the latter, the device being novel in its entirety.

A further object of the invention is the provision of a device of this character, wherein the structural make-up thereof is such that it can be fitted to the headlamps of motor vehicles without requiring any alteration or change in the latter and when in position will divert the rays of light for assuring safety in driving.

A still further object of the invention is the provision of a device of this character, which is simple in its construction, thoroughly reliable and efficient in its operation, readily and easily applied to and removed from a vehicle, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary side elevation of a motor vehicle partly in section with the device constructed in accordance with the invention applied to a headlamp of such vehicle.

Figure 2 is a front elevation.

Figure 3 is an enlarged top plan view of a headlamp with the device applied.

Figure 4 is an enlarged fragmentary side view of a steering post with the control for the device applied thereto and being partly in section.

Figure 5 is a diagrammatic plan view of a light circuit for dimming of a headlamp.

Similar reference characters indicate corresponding parts throughout the several views in the drawing.

Referring to the drawing in detail, A designates generally a portion of a motor vehicle and B the steering column as arranged within the body of the vehicle while as is usual there is arranged at each side of the vehicle at its front a headlamp 10 of standard kind and upon the lamp at the left hand side of the vehicle is adapted to be arranged the device so as to divert the light from this lamp to the right hand side of the vehicle and thereby relieving the ray of light from such lamp from blinding effect on an approaching driver of a motor vehicle, the device being hereinafter fully described.

The device comprises a split clamping ring or band 11, its ends being out-turned to provide ears 12 for accommodating a fastener 13 so that the said band can be clamped upon the headlamp 10 for snugly embracing the same at the front thereof.

This ring or band 11 has formed therewith a pair of spaced pintle lugs 14, these being located at the outer side of the lamp 10 for accommodating a hinge pintle 15 which is also engaged with pintle lugs 16 provided on a plate-like shade, shield or blind 17 adapted for horizontal swinging movement in a path forwardly of the light admitting front end of the lamp 10. This shade, shield or blind 17 at its outer side is formed with longitudinally directed reinforcing ribs 18 which materially strengthen the same. Surrounding the pintle 15 is a coiled tensioning spring 19, its ends being fixed to the band or ring 11 and the shade, shield or blind 17, respectively, and the purpose of this spring is to urge the latter in a lateral direction to the left hand side of the lamp 10 or what may be termed in an opening direction to allow the rays of light from the lamp 10 to be projected forwardly of the vehicle and diverting such rays of light from the left hand side of the vehicle in the direction of the right hand side thereof.

The lower outer corner of the shade, shield or blind is cut away to accommodate a laterally swinging shutter 20 hinged at 21 and adjustable by an adjusting screw 22 carried at 23 upon said shade, shield or blind 17, the shutter 20 being a supplemental diverter for the light rays from the lamp 10 to avoid the casting of a ray of light crosswise of the fender at the forward end portion thereof on the left hand side of the vehicle.

The steering column B supports a tubular housing 24 which is made secure to the said column by clips 25 embracing the same and within this housing is a control in the form of a shiftable rod 26, the upper end of the same being extended above the housing and terminates in a hand grip or handle 27 in convenient reach of the driver of the motor vhicle A. The rod 26 carries a toothed rack 28 while the housing is formed with a toothed rack 29 cooperating with the latter so that said rod 26 can be latched in adjusted position within the housing. This rod 26 is urged by a spring 30 in a direction to have the racks 28 and 29 interfit with each other or latch one with the other and such spring has sliding contact with the housing 24 interiorly thereof.

At proper location and suitably mounted in the vehicle A are guide pulleys 31 over which is trained a shift cable 32 having connection at 33 with the lower end of the rod 26 and at 34 with the shade, shield or blind 17 so that when the control is actuated the said shade, shield or blind will be moved for varying the angular disposition thereof in front of the lamp 10. Normally this shade, shield or blind 17 is disposed at substantially right angles to the plane of the glass front or lens of the lamp 10 and in this position diverts the ray of light therefrom from the left hand side to the right hand side of the vehicle A and in this fashion avoiding the blinding of an approaching driver or pedestrian at the left of such vehicle.

In Figure 5 of the drawing there is shown diagrammatically a light circuit 35 for the headlamps and in association with this circuit is a switch contrivance 36 which is manually controlled for the dimming of the light issuing from the headlamp at the right hand side of the vehicle while the headlamp at the left hand side will remain on and bright.

The device when installed will relieve glare from the left side of a road way as the light will be diverted from this side and in this manner avoiding the blinding of approaching or oncoming traffic to the driver of a vehicle or a pedestrian.

The shutter 20 carries a mirror 37 which will enable an approaching driver or pedestrian to know on which side the shade, shield or blind 17 is located as light from the lamps of the approaching vehicle will be reflected by the said mirror.

What is claimed is:

In a device of the class described a plate-like adjustable shield adapted to be interposed at an angle across the path of light rays from a headlight so as to intercept said rays and to deflect the same to the side of the road, a clamping band for embracing the front end of the headlight and having the shield hinged thereto, the said shield being provided with a cut away portion at the outer lowermost corner thereof, a swinging shutter fitting said cut away portion, and means for adjusting said shutter flush with or angularly with relation to the shield.

BERNHARD JANSSEN.